(12) United States Patent
Fagerkvist et al.

(10) Patent No.: US 10,070,024 B2
(45) Date of Patent: Sep. 4, 2018

(54) ARRANGEMENT FOR SUPPORTING A MONITORING CAMERA AND A METHOD FOR ASSEMBLING THE ARRANGEMENT

(71) Applicant: Axis AB, Lund (SE)

(72) Inventors: David Fagerkvist, Bunkeflostrand (SE); Alexander Rosenkvist, Sjobo (SE)

(73) Assignee: Axis AB, Lund (SE)

( * ) Notice: Subject to any disclaimer, the term of this patent is extended or adjusted under 35 U.S.C. 154(b) by 7 days.

(21) Appl. No.: 15/378,816

(22) Filed: Dec. 14, 2016

(65) Prior Publication Data

US 2017/0171436 A1      Jun. 15, 2017

(30) Foreign Application Priority Data

Dec. 15, 2015    (EP) ..................................... 15200099

(51) Int. Cl.
*H04N 5/225*       (2006.01)
*F16C 11/06*       (2006.01)
(Continued)

(52) U.S. Cl.
CPC ........... *H04N 5/2252* (2013.01); *F16C 11/06* (2013.01); *F16C 11/0609* (2013.01);
(Continued)

(58) Field of Classification Search
CPC .... H04N 5/2252; H04N 5/2253; H04N 7/183; F16C 11/0609; F16C 11/06; F16M 11/14;
(Continued)

(56) References Cited

U.S. PATENT DOCUMENTS

| | | | |
|---|---|---|---|
| 5,073,417 A | 12/1991 | Bowerman | |
| 5,790,910 A | 8/1998 | Haskin | |
| 5,803,642 A | 9/1998 | Sassmannshausen | |
| 9,612,506 B1 * | 4/2017 | Webb | ................... G03B 17/561 |

(Continued)

FOREIGN PATENT DOCUMENTS

| | | |
|---|---|---|
| DE | 43 33 913 A1 | 4/1994 |
| DE | 10 2012 101 007 A1 | 8/2013 |
| FR | 330 774 | 8/1903 |
| FR | 2 538 078 A1 | 6/1984 |
| GB | 894888 | 4/1962 |
| KR | 10-1547454 | 8/2015 |
| SE | 450 598 | 7/1987 |

(Continued)

OTHER PUBLICATIONS

European Search Report dated Jun. 10, 2016 in European Application 15200099, filed on Dec. 15, 2015 ( with Written Opinion).

(Continued)

*Primary Examiner* — Mekonnen Dagnew
(74) *Attorney, Agent, or Firm* — Oblon, McClelland, Maier & Neustadt, L.L.P.

(57) ABSTRACT

An arrangement for supporting a monitoring camera is provided. The arrangement comprising: an arm (102), a ball (104) associated with a free end (106) of the arm (102) and comprising a first (108) and a second (110) ball segment, a body (112) having an ball socket (114) accommodating the ball (104), an arm opening (116) arranged in the ball socket (114) and an abutment opening (118), wherein the arm (102) extends from the ball socket (114) through the arm opening (116), and wherein the first (108) and second (110) ball segments are connectible to the free end (106) of the arm (102) by insertion of the free end (106) of the arm (102) into the ball socket (114) through the arm opening (116) and insertion of the first (108) and second (110) ball segments into the ball socket (114) through the abutment opening (118). A method (400) for assembling the arrangement (100) for supporting a monitoring camera is further provided.

14 Claims, 4 Drawing Sheets

(51) Int. Cl.
*F16M 13/02* (2006.01)
*H04N 7/18* (2006.01)
*F16M 11/14* (2006.01)
*G08B 13/196* (2006.01)

(52) U.S. Cl.
CPC ............ *F16M 11/14* (2013.01); *F16M 13/02* (2013.01); *H04N 5/2253* (2013.01); *H04N 7/183* (2013.01); *F16M 2200/06* (2013.01); *G08B 13/19619* (2013.01); *G08B 13/19632* (2013.01)

(58) Field of Classification Search
CPC ............... F16M 13/02; F16M 2200/06; G08B 13/19632; G08B 13/19619
See application file for complete search history.

(56) References Cited

U.S. PATENT DOCUMENTS

2015/0013565 A1   1/2015   Guzman et al.
2016/0290387 A1*  10/2016  Richman .................. F16B 2/02

FOREIGN PATENT DOCUMENTS

TW          275 100      5/1996
WO       WO 93/19410     9/1993

OTHER PUBLICATIONS

Novelty Search Report, Swedish Patent and Registration Office, dated Oct. 12, 2015.

* cited by examiner

ARRANGEMENT FOR SUPPORTING A MONITORING CAMERA AND A METHOD FOR ASSEMBLING THE ARRANGEMENT

FIELD OF THE INVENTION

The invention relates an arrangement for supporting a monitoring camera and a method for assembling the arrangement.

BACKGROUND OF THE INVENTION

Monitoring cameras such as network cameras are used for many applications, both indoors and outdoors, to monitor a scene. The excellence at which a scene may be monitored depends on several factors such as the imaging quality and the durability of the monitoring camera as well as the location and/or directionality of the monitoring camera relative to the scene. To improve the versatility of the monitoring cameras it is further often desirable to change the viewing directionality of the monitoring camera. A single monitoring camera may thereby view different scenes. To achieve this, a number different camera mounting brackets are on the market which enable angular rotation of the monitoring camera in space. The assembly of the camera mounting brackets and the mounting to the monitoring cameras are, however, often complicated and more efficient and cost-effective solutions are needed. The camera mounting brackets typically comprise a plurality of elements making it challenging to design camera mounting brackets which are compact and on the same durable such that they for instance are resistant to rain and dust which may damage the monitoring bracket itself or degrade the positioning of the camera in space.

It is therefore desirable to design novel camera mounting brackets which overcome at least these shortcomings while still providing efficient redirectionability of a monitoring camera's field of view when wanted. It is further desirable to find efficient and cost-effective solutions for assembly of the camera mounting brackets and for mounting the monitoring cameras to the camera mounting brackets.

SUMMARY OF THE INVENTION

It is an object of the present invention to provide a lens arrangement preventing at least some of the problems disclosed above. It is an object of the present invention to further provide an arrangement for supporting a monitoring camera which is easy to assembly. A further object is for the arrangement to allow for a more durable and tighter arrangement. According to a first aspect of the invention, this and other objects that will be evident from the following description are achieved by providing an arrangement for supporting a monitoring camera, the arrangement comprising: an arm, a ball associated with a free end of the arm and comprising a first and a second ball segment, a body having an ball socket accommodating the ball, an arm opening arranged in the ball socket and an abutment opening, wherein the arm extends from the ball socket through the arm opening, and wherein the first and second ball segments are connectible to the free end of the arm by insertion of the free end of the arm into the ball socket through the arm opening and insertion of the first and second ball segments into the ball socket through the abutment opening.

An arrangement is thus provided in which the body may be formed in one part. A more durable and tighter arrangement is thereby provided.

An improved assembly of the arrangement is further provided. The arrangement is assembled by inserting the arm through the arm opening and the free end of the arm is connected to the first and second ball segments. The ball is formed after the insertion by assembly of the first ball segment and a second ball segment. The openings of the body may be made smaller than the diameter of the ball as the first and a second ball segment are insertable into the ball socket through the abutment opening.

The arrangement may, moreover, be assembled although the arm is attached to an object, such as the housing of a monitoring camera, which is larger in extension than the openings of the body. A more versatile arrangement is achieved. The arm may for instance be part of a housing of a monitoring camera.

The wording connected is to be understood as joined or linked together. The free end of the arm may for example be connected to the ball by the assemblage of the second ball segment to the first ball segment.

The free end of the arm may comprise a first and a second mounting surface. Surfaces on the free end of the arm are thereby provided on which the first and second ball segments may be arranged. The first and the second mounting surfaces may mate with respectively ball segments. The free end of the arm may thereby be efficiently coupled to the respectively ball segments such that the ball is formed.

The free end of the arm may comprise a third ball segment.

The material of the arm and/or of the first and the second ball segments may comprise a plastic or a plastic comprising metal.

The first and the second ball segments and the arm may comprise different materials.

The ball may comprise a plurality of different segments. The ball may further comprise different materials. A larger flexibility for forming the ball is thereby provided.

The ball formed by the ball segments may have a truncated spherical shape. A passage or compartment may thereby be formed within the ball socket such that for example an electrical and/or optical cable may be arranged in the passage. An electrical and/or optical connection to a monitoring camera may be provided through the interior of the arrangement. The arrangement may protect the cable(s) from the environment of the monitoring camera.

A connection end of the arm being opposite to the free end of the arm may be integrally formed with a housing or a bracket. A portion of the housing or the bracket may form the arm. A simplified attachment of the housing or the bracket to the arrangement may be provided. The housing may for example be the housing of a monitoring camera. An improved joining of the monitoring camera to the arrangement may thereby be provided.

The arrangement above may further comprise an abutment insertable through the abutment opening, the abutment closing the ball socket accommodating the ball.

The abutment may be movably arranged relative to body such that a locking of the position of the ball in the ball socket is achieved.

The angular position of the ball and thereby of the arm relative to the ball socket is achieved. The direction of the arm relative to the body may thereby be set in the locked position. The abutment may be tightly arranged relative to the ball socket by a screw or snap-fit lock-in arrangement.

According to a second aspect of the invention, a method for assembling an arrangement for supporting a monitoring camera is provided. The arrangement comprising: an arm, a ball, a body having an ball socket arranged to accommodate the ball, an arm opening arranged in the ball socket and an abutment opening, the method comprising: introducing a free end of the arm into the ball socket through the arm opening, forming the ball by introducing a first ball segment into the ball socket through the abutment opening, and connecting it to the free end of the arm, and introducing a second ball segment into the ball socket through the abutment opening, and connecting it to the free end of the arm.

The function and benefits of the method are described above in relation to the arrangement for for supporting a monitoring camera. The method further provides an efficient and cost effective assembly.

The above mentioned features, when applicable, apply to this second aspect as well. It is noted that the invention relates to all possible combinations of features recited in the claims.

The step of introducing the free end of the arm into the ball socket through the arm opening may comprise exposing a first mounting surface of the free end of the arm to the abutment opening, and wherein the step of connecting the first ball segment to the free end of the arm comprising mounting it to the first mounting surface.

The step of connecting the first ball segment to the free end of the arm may be succeeded by a step of rotating the arm such that a second mounting surface of the free end of the arm is exposed to the abutment opening and wherein the step of connecting the second ball segment to the free end of the arm comprising mounting it to the second mounting surface.

The wording exposing a mounting surface of the free end of the arm to the abutment opening should be construed as providing access to the mounting surface via the abutment opening. A simplified attachment of the first and second ball segment to the free end of the arm is thereby achieved.

The rotating of the arm may be 180°.

The method described above may further comprise inserting an abutment through the abutment opening for closing the ball socket accommodating the ball. A locking of the angular position of the ball and of the arm relative to the ball socket may thereby be achieved. The direction of the arm relative to the body may be set in the locked position.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

An arrangement 100 for supporting a monitoring camera is in the following described with reference to FIGS. 1 and 2.

Figure 1:
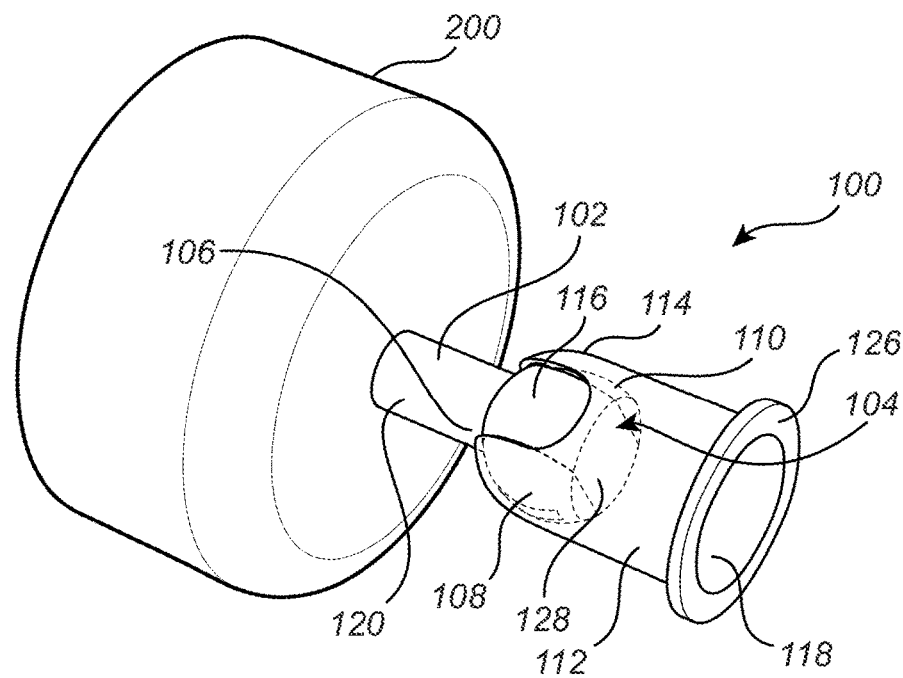
FIG. 1 illustrates a perspective side view of an arrangement for supporting a monitoring camera according to one embodiment of the present invention.

FIG. 1 illustrates a perspective side view of an arrangement for supporting a monitoring camera. The arrangement 100 is attached to a monitoring camera, more specifically to a portion of a housing 200 of the monitoring camera as illustrated in FIG. 1. The arrangement 100 comprises an arm 102 and a ball 104 associated with a free end 106 of the arm 102. The ball 104 comprises a first 108 and a second 110 ball segment. In the shown embodiment, the ball 104 further comprises a third ball segment formed by the free end 106 of the arm 102 itself. The arrangement 100 further comprises a body 112 having a ball socket 114 accommodating the ball 102. The body 112 is formed in one part. A more durable and tighter or compact arrangement is thereby provided.

The ball 104 is arranged inside at the ball socket 114 allowing for a relative movement of the ball 104 relative to the ball socket 114. The ball 104 may be tightly fitted into the ball socket 114 such that play in radial direction between the ball 104 relative to the ball socket 114 may be prevented. A more smooth movement of the ball 104 inside the ball socket 114 is thereby provided.

An arm opening 116 is arranged in the ball socket 114 such that the arm 102 may extend from the ball socket 114 through the arm opening 116. The body 112 further comprises an abutment opening 118.

The first 108 and second 110 ball segments are connected to the free end 106 of the arm 102. The ball 104 may be assembled by inserting the free end 106 of the arm 102 into the ball socket 114 through the arm opening 116 and inserting the first 108 and second ball segments 110 into the ball socket through the abutment opening 118, as will be discussed in more detail below.

A connection end 120 of the arm 102 being opposite to the free end 106 of the arm is integrally formed with the housing 200 of the monitoring camera. As will be further described below, the arrangement 100 may thereby be assembled efficiently although the arm 102 is attached to a housing 200 of a monitoring camera. The housing 200 may, moreover, be larger in extension than the openings 116 and 118 of the body 112. A more versatile arrangement is achieved.

It should be noted that the end of the arm could alternatively be integrally formed with a bracket (not shown). The bracket may be adapted to form a support for a monitoring camera.

Figure 2:
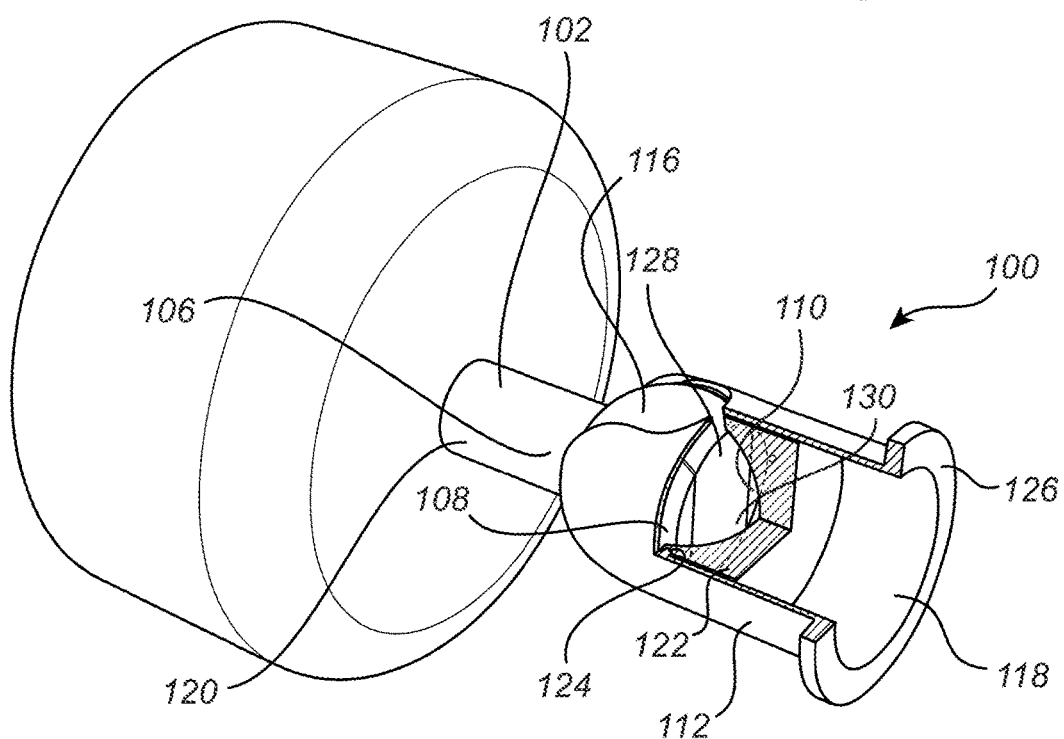
FIG. 2 illustrates the same arrangement as in FIG. 1 according to a second embodiment of the present invention.

The arrangement may further comprise an abutment 122, see FIG. 2. The abutment 122 is arranged to close the ball socket 114 accommodating the ball 104. The ball 104 be held in place by the abutment 122. The abutment 122 may moreover be inserted through the abutment opening 118 allowing for efficient assembly.

The abutment 122 may be snap fitted to the body 112 by means of a snap-fit locking mechanism 124.

The abutment 122 may alternately be screw-locked in position.

The abutment 122 may be movable between a locking position and a non-locking position.

The abutment 122 may be movably arranged relative to body 112 such that a locking of the position of the ball 104 in the ball socket 114 is achieved. The abutment 122 may thereby, in the locking position, provide a force on the ball 104 such that the ball 104 is locked in position relative to the ball socket 114. The direction of a monitoring camera relative to the body 112 may thereby be set such that a desired scene may be monitored.

The ball 104 may be rotated in position inside the ball socket 114 in the non-locking position of the abutment 122. The direction of the arm 102 and thereby by the monitoring camera relative to the body 112 may thereby be changed.

The transition between the locking position and the non-locking position may be continuous. The transmission between the locking position and the non-locking position may be achieved by a screw motion of the abutment 122 relative to the body 112.

An end portion 126 of the body 112 may further be adapted to be fixed to a surface such as a wall or a ceiling or to a holder such as a tripod.

In the shown embodiment, the ball 104 formed by the ball segments has a truncated spherical shape 128. A passage or compartment 130 may thereby be formed within the ball socket 114 such that for example an electrical and/or optical cable may be arranged in the passage 130. An electrical and/or optical connection (not shown) to the monitoring camera may be provided through the interior of the arrangement 100. The arrangement 100 may thereby protect the cable(s) from the environment of the monitoring camera. The arm 102 may further comprise an opening (not-shown) providing a channel for the cables(s) through the arm to the housing 200. Further, the abutment 122 may be provided with an opening allowing cables to extend from the body 112 of the arrangement 100 via the abutment opening 118.

The material of the arm 102 and/or of the first 108 and the second 110 ball segments may comprise a plastic or a plastic comprising metal. The first 108 and the second 110 ball segments and the arm 102 may comprise different materials. The physical properties of the arrangement 100 may be tailored by selecting different materials. The free end 106 of the arm 102 may, for example, comprise a durable and rigid material providing a stiff arrangement for supporting a monitoring camera. The first 108 and the second 110 ball segments may comprise the same material as the free end 106 of the arm 102. The first 108 or the second 110 ball segments may alternatively comprise a different material. The material of the first 108 or the second 110 ball segments may be chosen such that the friction between the ball segment(s) 108, 110 and the ball socket 114 is minimized. A smooth and consistent movement of the ball 104 relative the ball socket 114 may thereby be provided. Wear of the ball 104 or the ball socket 114 may, moreover, be reduced by the appropriate choice of materials. An arrangement 100 with improved rigidity and improved movement may thereby be provided.

The material of the first 108 or the second 110 ball segments may, moreover, be chosen such that a desired friction between the ball segment(s) 108, 110 and the ball socket 114 is obtained. The friction may be set to a value such that the force, exerted on a portion of the ball 104 by the abutment 122, needed to lock the position of the ball 104 in the ball socket 114 is reduced. A more efficient locking is obtained. The material of the first 108 or the second 110 ball segments may, for example, comprise a plastic or rubber material.

In the following, a method for assembling an arrangement 100 for supporting a monitoring camera is described with relation to FIGS. 3a-3d and FIG. 4. FIGS. 3a-3d illustrate a cross sectional side view of the assembly of arrangement 100 and FIG. 4 illustrates actions of the method 400 for assembling the arrangement 100.

Figure 3A:
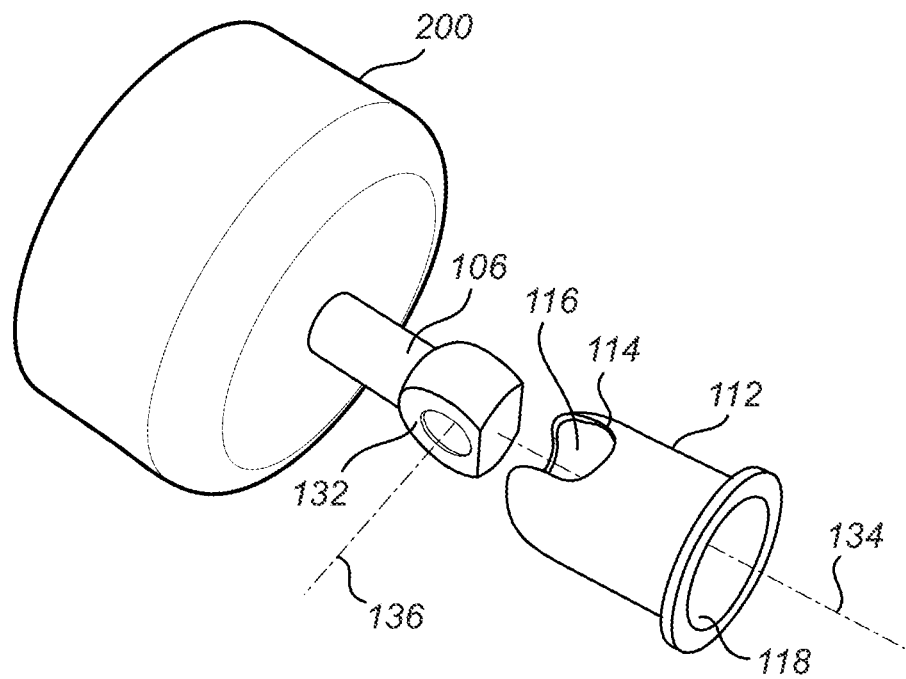
FIGS. 3a-3d illustrate the assembly of an arrangement for supporting a monitoring camera.

FIG. 3a illustrates an arm 102 attached to a holder 200 and a body 112. The body 112 has a ball socket 114 arranged to accommodate a ball 104, an arm opening 116 arranged in the ball socket 114 and an abutment opening 118 as discussed above in relation to FIGS. 1 and 2.

Figure 4:
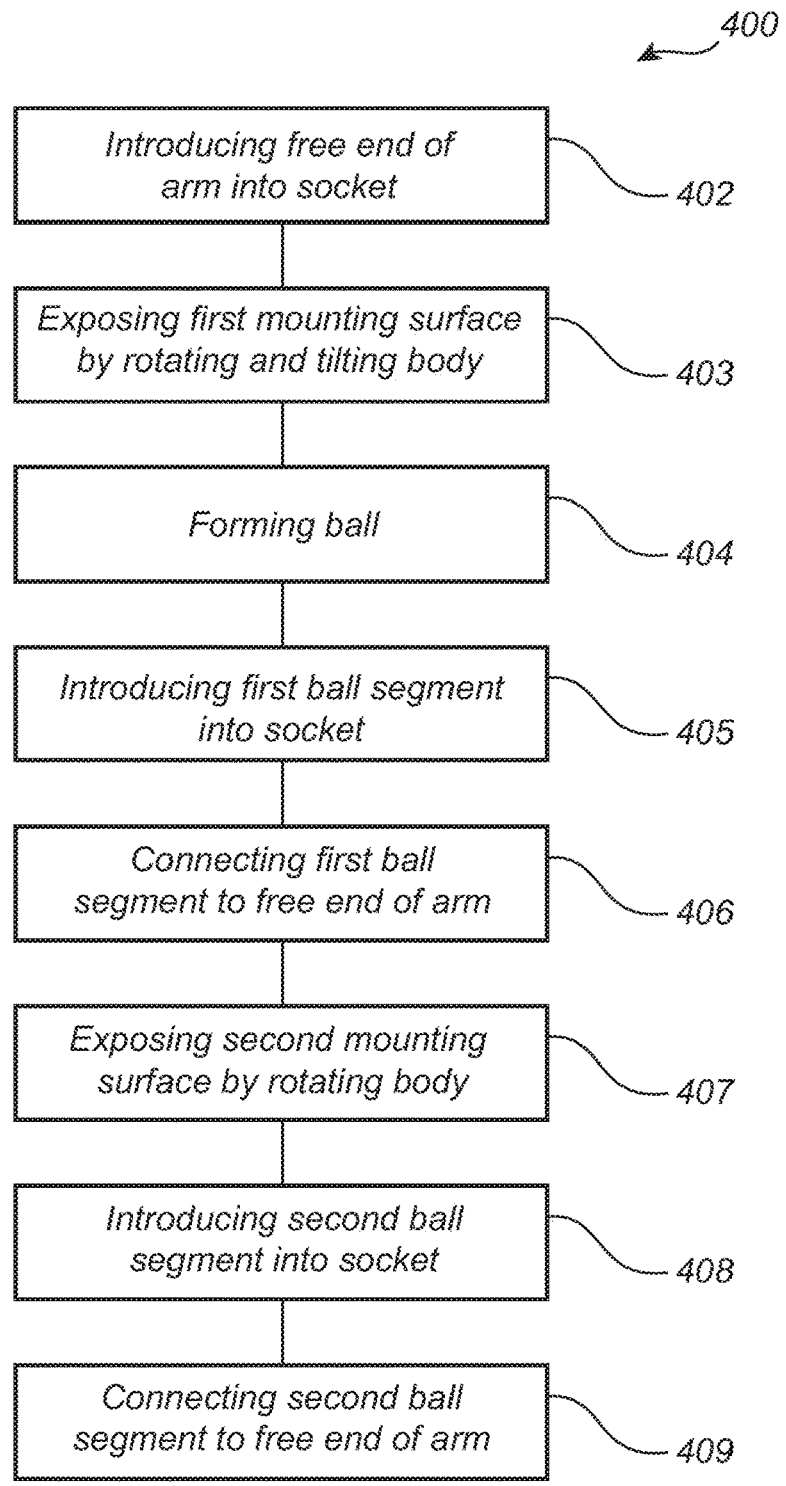
FIG. 4 illustrates a method for assembling an arrangement for supporting a monitoring camera.

The method 400 comprises the step of introducing 402, see FIG. 4, a free end 106 of the arm 102 into the ball socket 114 through the arm opening 116.

Figure 3B:
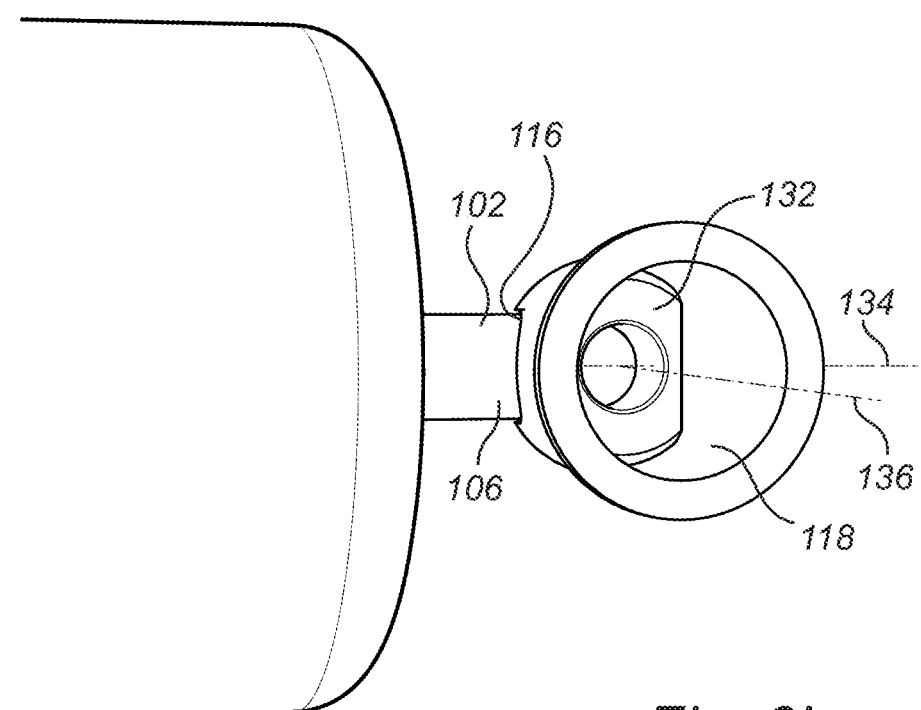
Figure 3C:
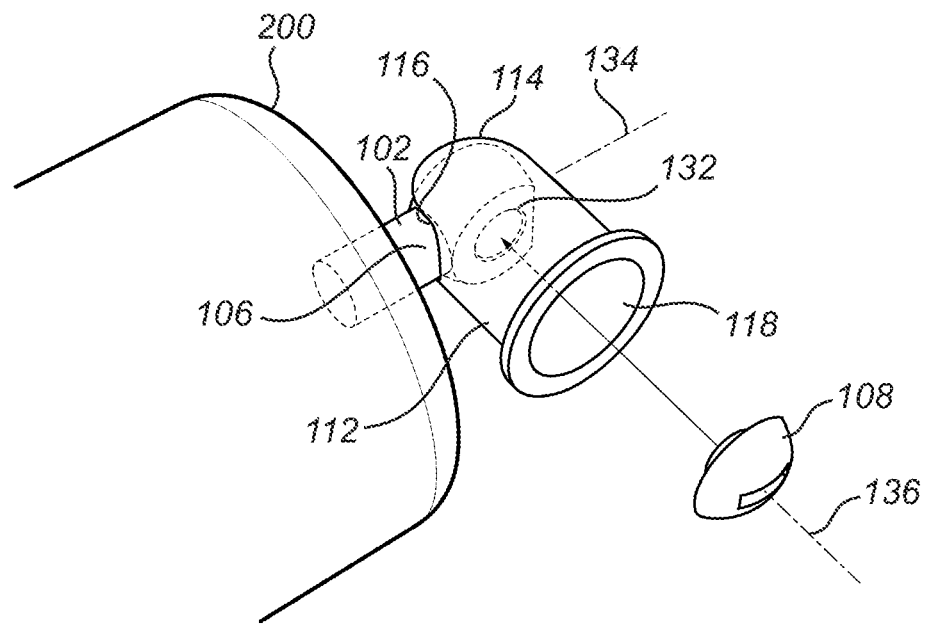
Figure 3D:
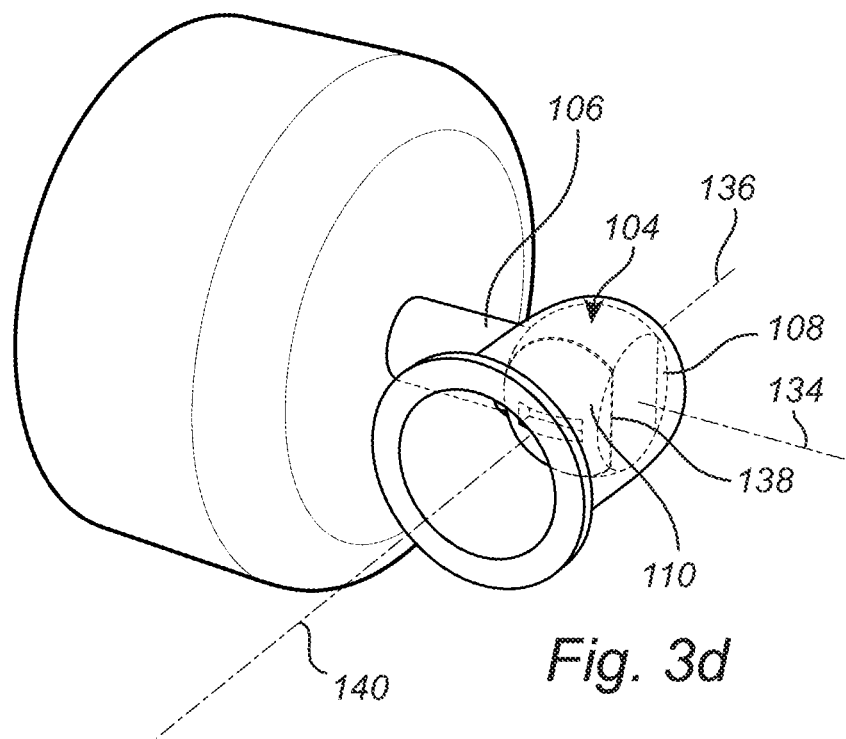

The step of introducing 402 the free end 106 of the arm 102 into the ball socket 114 through the arm opening 116 is followed by the step of exposing 403 a first mounting surface 132 of the free end 106 of the arm 102 to the abutment opening 118, as illustrated in FIG. 3b. The exposing 403 the first mounting surface 132 is achieved by a rotation of the body 112 of an angle of 90° relative to the long axis 134 of the arm 102 and a tilting the body 112 an angle of 90° in a direction 136 perpendicular to the long axis 134 of the arm 102. The ball 104 may thereafter be formed 404 by introducing 405 the first ball segment 108 into the ball socket 114 through the abutment opening 118, as illustrated in FIG. 3c. The ball segment 108 may thereby be mounted to the first mounting surface 132 such that the first ball segment 108 is connected 406 to the free end 106 of the arm 102. The mounting may for example be achieved by a snap-fit lock-in or a screw lock arrangement.

To complete the formation 404 of the ball 104, the second ball segment 110 is subsequently introduced 408 into the ball socket 114 through the abutment opening 118. The second ball segment 110 is then connected 409 to the free end 106 of the arm 102. This may be achieved after the step of connecting 406 the first ball segment 108 to the free end 106 of the arm 102 has been performed. A further rotation of the body 102 exposes 407 the second mounting surface 138 of the free end 106 of the arm 102 to the abutment opening 118. The rotating of the body 112 is for this embodiment 180° relative to the long axis 134 of the arm 102 such that the abutment opening is pointing in a direction 140 being anti-parallel to the direction 134. The second ball segment 110 may then be mounted to the second mounting surface 138 of the free end 106 of the arm 102. The mounting may for example be achieved by a snap-fit lock-in or a screw lock arrangement.

The actions of have above been described as rotations of the body 112 relative to the arm 102. The skilled person in the art realizes that it is a relative rotation and the arm 102 may alternatively be described to rotate relative to the body 112, e.g. 180°.

In the above description, the ball 104 is formed by the first and the second ball segments 108 and 110 as well as the free end 106 of the arm. The free end of the arm 106 may thereby be understood to form a third ball segment.

The method 400 may further comprise inserting an abutment through the abutment opening for closing the ball socket accommodating the ball.

The person skilled in the art realizes that the present invention by no means is limited to the preferred embodiments described above. On the contrary, many modifications and variations are possible within the scope of the appended claims.

A ball may for example be formed by two ball segments being mounted to each other and the free end of the arm.

The monitoring camera may be a digital camera providing video sequences.

Additionally, variations to the disclosed embodiments can be understood and effected by the skilled person in practicing the claimed invention, from a study of the drawings, the disclosure, and the appended claims.

The invention claimed is:

1. An arrangement for supporting a monitoring camera, the arrangement comprising:
   an arm;
   a ball associated with a free end of the arm, the ball including a first ball segment and a second ball segment; and
   a body having a ball socket accommodating the ball, an arm opening arranged in the ball socket and an abutment opening,
   wherein the arm extends from the ball socket through the arm opening, and
   wherein the first and second ball segments are connectible to the free end of the arm by insertion of the free end of the arm into the ball socket through the arm opening and insertion of the first and second ball segments into the ball socket through the abutment opening, and
   wherein the free end of the arm includes a third ball segment.

2. The arrangement according to claim 1, wherein the free end of the arm includes a first mounting surface and a second mounting surface.

3. The arrangement according to claim 1, wherein the first, the second and the third ball segments jointly form an outer envelope surface of the ball.

4. The arrangement according to claim 1, wherein the material of the arm and/or of the first and the second ball segments comprise a plastic or a plastic comprising metal.

5. The arrangement according to claim 1, wherein the first and the second ball segments and the arm comprise different materials.

6. The arrangement according to claim 1, wherein the ball formed by the ball segments has a truncated spherical shape.

7. The arrangement according to claim 1, wherein a connection end of the arm being opposite to the free end of the arm is integrally formed with a housing or a bracket.

8. The arrangement according to claim 1, further comprising an abutment insertable through the abutment opening, the abutment closing the ball socket accommodating the ball.

9. The arrangement according to claim 8, wherein the abutment is movably arranged relative to body such that a locking of the position of the ball in the ball socket is achieved.

10. A method for assembling an arrangement for supporting a monitoring camera, the arrangement including an arm, a ball, a body having a ball socket arranged to accommodate the ball, and an arm opening arranged in the ball socket and an abutment opening, the method comprising:
    introducing a free end of the arm into the ball socket through the arm opening;
    forming the ball by introducing a first ball segment into the ball socket through the abutment opening, and connecting it the first ball segment to the free end of the arm; and
    introducing a second ball segment into the ball socket through the abutment opening, and connecting the second ball segment to the free end of the arm.

11. The method according to claim 10, wherein the step of introducing the free end of the arm into the ball socket through the arm opening includes exposing a first mounting surface of the free end of the arm to the abutment opening, and wherein the step of connecting the first ball segment to the free end of the arm includes mounting the first ball segment to the first mounting surface.

12. The method according to claim 10, wherein the step of connecting the first ball segment to the free end of the arm is succeeded by a step of rotating the arm such that a second mounting surface of the free end of the arm is exposed to the abutment opening and wherein the step of connecting the second ball segment to the free end of the arm includes mounting the second ball segment to the second mounting surface.

13. The method according to claim 12, wherein the rotating of the arm is 180°.

14. The method according to claim 10, further comprising inserting an abutment through the abutment opening for closing the ball socket accommodating the ball.

* * * * *